United States Patent
Peele et al.

(10) Patent No.: US 7,149,361 B2
(45) Date of Patent: Dec. 12, 2006

(54) METHOD AND APPARATUS FOR IMAGE PROCESSING TO DETECT CHANGES IN A SCENE

(75) Inventors: Larry Peele, Orlando, FL (US); Eugene Cloud, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 592 days.

(21) Appl. No.: 10/303,759

(22) Filed: Nov. 26, 2002

(65) Prior Publication Data

US 2004/0101200 A1 May 27, 2004

(51) Int. Cl.
*G06K 9/36* (2006.01)
*G06K 9/46* (2006.01)
*G06K 9/00* (2006.01)

(52) U.S. Cl. ..................... 382/236; 382/107
(58) Field of Classification Search ................ 382/236, 382/235
See application file for complete search history.

(56) References Cited

U.S. PATENT DOCUMENTS

| | | | |
|---|---|---|---|
| 4,449,240 A | 5/1984 | Yoshida | |
| 5,245,675 A | 9/1993 | Ferre et al. | |
| 5,500,904 A | 3/1996 | Markandey et al. | |
| 5,539,841 A | 7/1996 | Huttenlocher et al. | |
| 5,563,960 A | 10/1996 | Shapiro | |
| 5,822,459 A | 10/1998 | Macy | |
| 5,838,823 A * | 11/1998 | Ancessi | 382/232 |
| 5,880,856 A | 3/1999 | Ferriere | |
| 5,884,296 A | 3/1999 | Nakamura et al. | |
| 6,421,463 B1 * | 7/2002 | Poggio et al. | 382/224 |
| 6,671,391 B1 * | 12/2003 | Zhang et al. | 382/118 |
| 6,704,718 B1 * | 3/2004 | Burges et al. | 706/21 |
| 6,751,354 B1 * | 6/2004 | Foote et al. | 382/224 |
| 6,891,974 B1 * | 5/2005 | Malvar et al. | 382/232 |
| 2003/0086623 A1 * | 5/2003 | Berkner et al. | 382/260 |

OTHER PUBLICATIONS

"An Introduction To Wavelets", Gaps, Amara, 1995, Institute of Electrical and Electronic Engineers - 18 pages.
G. Kaiser; *A Friendly Guide to Wavelets*; Sixth Printing; The Virginia Center for Signals and Waves, 1994, 2 page summary.

\* cited by examiner

*Primary Examiner*—Joseph Mancuso
*Assistant Examiner*—Damon Conover
(74) *Attorney, Agent, or Firm*—Buchanan Ingersoll & Rooney, PC

(57) ABSTRACT

A method and apparatus for image processing to detect changes in a scene includes compressing by computing a wavelet transform of an image corresponding to the scene, thresholding coefficients associated with the transform, and comparing a subset of coefficients with values to detect and indicate a change in the image. Values such as averages and a standard deviation therefrom can be generated during training by processing N training images. Determining whether a change has occurred includes determining the value of image sets, standard deviation and training sets, and comparing these, based on the type of change to be ascertained, to statistical information.

24 Claims, 6 Drawing Sheets

METHOD AND APPARATUS FOR IMAGE PROCESSING TO DETECT CHANGES IN A SCENE

BACKGROUND

1. Field of the Invention

The present invention relates to image analysis. More particularly, the present invention relates to a method and apparatus for detecting changes in an image and performing image compression using a statistical wavelet approach.

2. Background Information

Wavelet analysis of signals and images allows analysis of signals according to scale. Data associated with a signal or image can be divided into different frequency components and analyzed according to an appropriate scale for each respective component. Wavelet functions can be used to represent or approximate signal behavior at various points while satisfying certain mathematical constraints. Wavelet analysis is advantageous in analyzing signals or images having discontinuities or sharp spikes or edges. See, for example, "An Introduction To Wavelets", Gaps, Amara, 1995, Institute of Electrical and Electronic Engineers, the subject matter of which is incorporated herein by reference.

The use of analytic functions to allow for the approximation and, thus characterization of signal behavior is not new. Fourier analysis which can be used to approximate signal behavior using the superposition of known continuous, non-local functions was developed by Joseph Fourier in the early 1800s and is concerned primarily with frequency analysis. Wavelet analysis in contrast is focused on continuous refinements in scale of the approximating functions and allows for the analysis of the instantaneous behavior of a signal rather than its continuous behavior across the time domain. Wavelets allow for the approximation of finite signals having very sharp signal characteristics.

Wavelet analysis involves adopting a wavelet prototype function called an analyzing wavelet or mother wavelet. Frequency and time analysis can be performed with high and low frequency versions of the prototype wavelet. A wavelet expansion can then be used to represent the signal. Coefficients can be derived for the linear combination of wavelet functions which approximate the signal and can be used for data operations. Moreover, certain coefficients, for example, those below a selected threshold, can be truncated without significant effect, allowing a sparse representation of the signal, and giving rise to advantages in the area of, for example, data compression.

An objective of many data compression schemes is to produce the most efficient representation of a block of information with minimal cost in terms of overhead and processing. Conservative data compression schemes avoid changing input data. Other approaches reduce data to essential features or information content and store only those features or content. For compression approaches which reduce data to be successful, the correct reduction or filter step should be used to preserve essential data features.

While wavelet and Fourier transforms are both useful analytical tools and share similarities, they are different in that wavelet transforms, unlike Fourier transforms, are localized in space. Spatial localization and frequency localization properties associated with wavelets allow functions to be transformed sparsely into the wavelet domain. Moreover, since wavelet transforms are not constrained by a single set of basis functions as in Fourier transforms which use sine and cosine functions, information which might be obscured using Fourier analysis is made available using wavelet transforms. In fact, different families of wavelet basis functions can be selected based on tradeoffs involving desired spatial localization versus, for example, smoothness.

An analyzing wavelet or mother wavelet $\Phi(x)$ can be applied to approximate a signal by shifting and scaling, resulting in a family of wavelet functions which comprise the basis:

$$\Phi_{(s,l)}(x) = 2^{-s/2} \Phi(2^{-s} x - l) \quad (1)$$

where s and l are integers that scale and shift the mother function $\Phi$ to generate the wavelet family such as the Daubechies family (there are several well known so-called wavelet "families" named after their discoverers). The variable s determines the width of the wavelet and the location index l determines the position of the particular wavelet. The mother function $\Phi$ can be re-scaled by powers of 2 and shifted by integers giving rise to an interesting property of self-similarity. By understanding the properties of mother function $\Phi$, the properties of the wavelet basis, as shown in equation (1) are automatically known.

To apply equation (1) to a set of data, a scaling equation can be used:

$$W(x) = \sum_{k=-1}^{N-2} (-1)^k c_{k+1} \Phi(2x + k) \quad (2)$$

where $W(x)$ is the scaling function for the mother function $\Phi$, and $c_k$ are the wavelet coefficients. The wavelet coefficients should satisfy the linear and quadratic constraints of the form:

$$\sum_{k=0}^{N-1} c_k = 2, \quad \sum_{k=0}^{N-1} c_k c_l = 2\delta_{l,0} \quad (3)$$

where $\delta$ is the delta function and l is the location index. Coefficients $\{c_0, \ldots, c_n\}$ can be thought of as filter coefficients, with values being placed, for example, in a transformation matrix, which can then be applied to a data vector. Coefficients applied in this manner can operate, for example, as a smoothing filter, low pass filter, and/or as a high pass filter (which tends to accentuate detail contained within the data).

Another area of interest in signal and image processing and analysis is associated with change detection. Change detection deals with changes in signals which, in some cases, can be discontinuous in nature. Change detection can be used for signal or system modeling, and can play a role in, for example, pattern recognition, video monitoring, and other analysis associated with dynamic systems. Accordingly, methods have be developed in both on-line detection and off-line detection to serve different purposes.

One system developed for indicating changes between images is described in U.S. Pat. No. 5,500,904 to Markandey et al (hereinafter "Markandey"). Therein, a sequence of images is sensed and processed images are generated using previous images. An optical flow field can be generated indicating changes between images. The subject matter of the Markandey patent is hereby incorporated within by reference.

Other systems, such as described, for example, in U.S. Pat. No. 5,563,960 to Shapiro, are directed to emphasis on a selected region of an image to be compressed. Shapiro describes a scanning order for wavelet coefficients to provide a more efficient compression scheme. The subject matter of the Shapiro patent is hereby incorporated within by reference.

Another method for handling compression is disclosed in U.S. Pat. No. 5,539,841 ("Huttenlocher"), the subject matter of which is incorporated herein by reference. Huttonlocher describes a method for comparing image sections, referred to as tokens.

SUMMARY OF THE INVENTION

The present invention is directed to a method of image processing to detect changes in a scene. An exemplary method comprises computing a wavelet transform of an image corresponding to the scene to compress the image; thresholding coefficients associated with the computed wavelet transform to select a subset of coefficients; and comparing the selected subset of coefficients with at least one average value to detect and indicate a change in the image from at least one training image corresponding to the scene.

Exemplary embodiments are also directed to an apparatus for image processing to detect changes in a scene. An exemplary apparatus comprises, a memory; and a processor coupled to the memory, the processor being configured to compute a wavelet transform of an image corresponding to the scene to compress the image, threshold coefficients associated with the computed wavelet transform to select a subset of coefficients, and compare the selected subset of coefficients with at least one average value to detect and indicate a change in the image from at least one training image corresponding to the scene.

BRIEF DESCRIPTION OF THE DRAWINGS

The invention, as well as other features and advantages thereof, will be best understood by reference to the detailed description of the specific embodiments which follow, when read in conjunction with the accompanying drawings, in which.

DETAILED DESCRIPTION OF THE PREFERRED EMBODIMENTS

Figure 1:
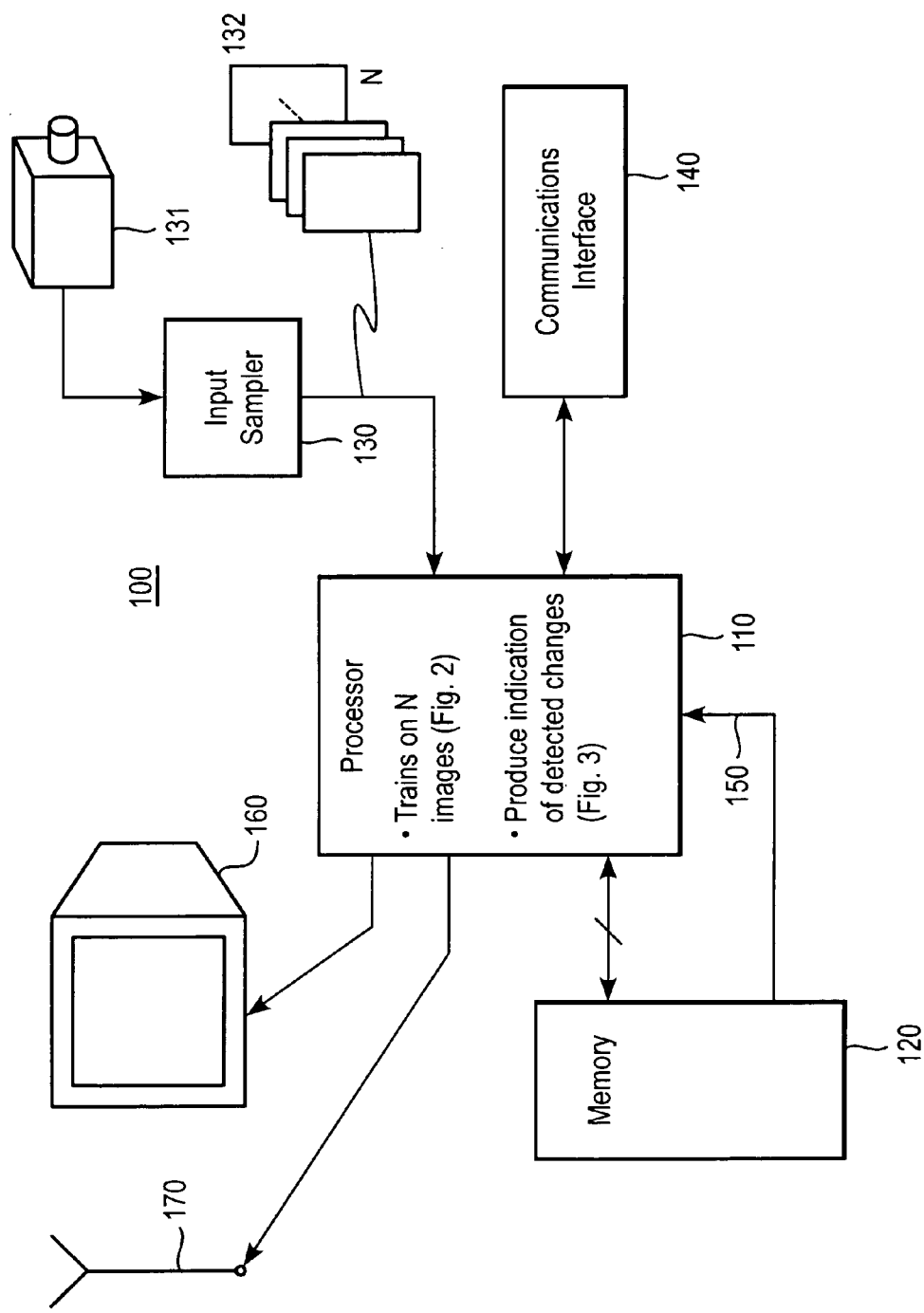
FIG. 1 is a block diagram illustrating an exemplary system in accordance with the present invention.

FIG. 1 is a block diagram illustrating an exemplary system in accordance with the present invention. System 100 includes a processor 110, which can be any suitable and readily available computer, microprocessor or the like. System 100 also includes a camera 131, or like input device to provide, for example, a stream of video or signal input to input sampler 130. Camera 131 can provide, for example, an NTSC analog video source (or any other video source such as PAL). Input sampler 130 can be a suitable interface for providing image frames 132. Alternatively, camera 131 can be a digital camera for providing a continuous stream of digital samples in which case input sampler 130 can be a frame grabber or the like, configured to select image frames to be processed.

In alternative embodiments in accordance with the present invention, data input can alternately, or in addition, be provided, for example, from communications interface 140 which can provide on-line (e.g. real time), or off-line (e.g. non-real time), data representing images or signals to be processed. Off-line data can be provided alternatively from memory 120 which can be configured to store data associated with images or signals received from any of the inputs and can store data associated with calculations of processor 110 such as averages and the like described herein.

Change detection and image compression in accordance with the present invention can be used to generate output data which can be sent, for example, to display 160, or can be output to communications channels associated with, for example, communications interface 140, or antenna 170, for radio communications. In addition, outputs from processor 110, can be stored in memory 120 for later retrieval.

In an exemplary embodiment, processor 110 can be configured (e.g., programmed) to train on a number, N, of images in a stream of image frames 132. After initial training, a new image can be tested by operation of processor 110 to determine when there are differences from values accumulated, for example, in memory 120 during training. Training can be updated by processor 110 by adding one or more additional images to the training set without recalculation of the entire set. A simple update procedure allows a training sequence to be computed based on the addition of the new image rather than reprocessing the entire set of N+1 training images for each new image to be added. Of course processor 110 can be configured as any suitable computer processor, or any number of dedicated processors, programmed using any suitable computer readable medium, to automatically perform any or all of the functions described herein.

In a given set of images, individual pixel values, for example, in an 8 bit intensity representation such as a grey scale, or in any other representation, can be represented as integers from zero to 255 or in any other desired representation. In a color pallet representation, each value, for example, Red, Green, Blue for an RGB display pallet, can be represented as an integer value from zero to 255. For higher or lower bit value representations, more or less intensity or color values can be used. Overall image intensity can vary from an image representing one scene look to a different image representing a scene look later in time. All data paths shown in FIG. 1 can be parallel or serial or any combination thereof.

Figure 2:
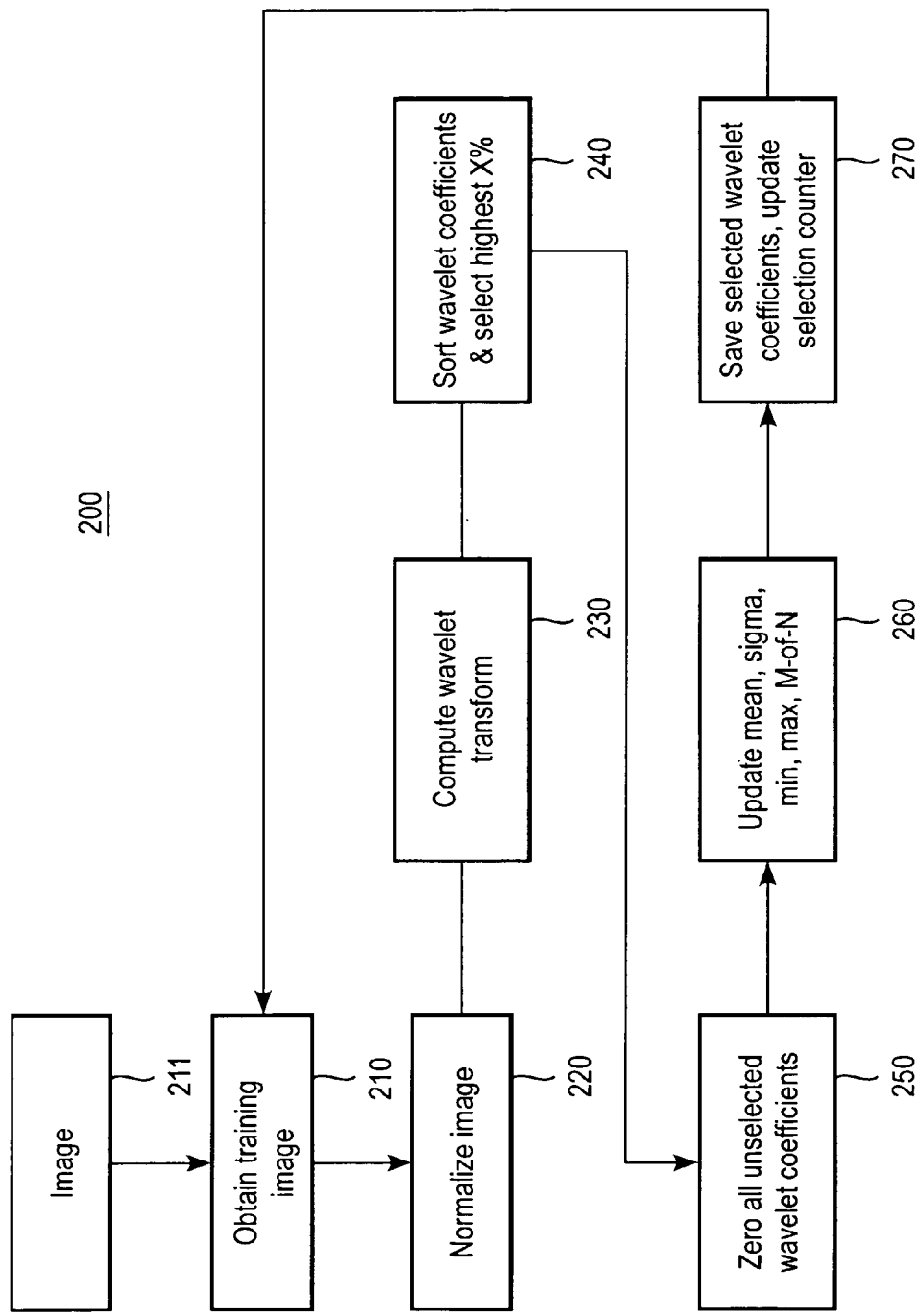
FIG. 2 is a flow chart illustrating an exemplary training process in accordance with the present invention.

FIG. 2 is a flow chart illustrating a functional block diagram of an exemplary training process in accordance with the present invention. In FIG. 2, image 211 (e.g., an image represented by m×n pixels) can be retrieved at step 210 from, for example, input sampler 130, memory 120, or the like. The intensity difference when viewed in individual image frames can have the effect of making the same object look bright in one image frame and dim in a different frame when no actual change in the object has occurred. Consequently, image normalization 220 as illustrated in FIG. 2 can be used for both image training as well as image testing.

One such scene normalization approach includes computing a minimum pixel value, a maximum pixel value, and an average pixel value in image 211. Pixel values can then be mapped to new values where the original interval from minimum to average is mapped linearly to the interval from zero to 127.5, or any desired interval. Also, the interval from average to maximum can be mapped linearly to the interval from 127.5 to 255, or any desired intervals. By re-mapping pixel values to fall within the predetermined intervals in the above example, pixel values can be normalized such that the average pixel value will be "forced" to 127.5, the minimum value will be zero, and the maximum value will be 255. Re-mapping can also aid in threshold definition wherein a threshold can be considered to be a pixel value which a certain percentage of pixels will exceed. Of course, any suitable normalization procedure can be used.

After normalization in step 220, each of one or more m×n training images can be wavelet transformed at step 230 using wavelet image compression as part of transformation and training. For each of the resulting sets of wavelet coefficients, the magnitudes can be computed. Each set of wavelet coefficients can be sorted. For example, a fast sort can be used to sort with the largest predetermined percentage X of the wavelet coefficients being retained. The retained coefficients are referred to a "selected" coefficients. A typical value for X can be about 0.05, as most of the useful information in an image is often retained by 5 percent of the coefficients. Accordingly, the threshold can be set at 5% in step 240. Alternately, any desired threshold can be used.

Each coefficient set corresponding to a compressed image can be processed by inverse wavelet transform to produce an approximation of the original image, if desired. Thus, the original training set of N images, (e.g., corresponding to m×n individual pixel values, where each of the N images includes m rows of pixels and n columns of pixels) become N thresholded sets of wavelet coefficients, with sub-threshold wavelet coefficients considered to be zero at step 250. For high degrees of correlation between successive images in a training set, pixel values for a given row and column location in each image can be highly correlated. A wavelet transform converts an m×n image into an m×n matrix of wavelet coefficients, where the row i and column j of the wavelet coefficient (the storage location of the wavelet coefficient within this matrix) correspond to a particular wavelet scale, a particular row translation operation, and a particular column translation operation. Consequently, a high degree of correlation between wavelet coefficients from successive images can be expected. Wavelet coefficients which are discarded can be fairly correlated from one image to the next based on location within the coefficient matrix.

In accordance with an exemplary embodiment of the present invention, for each of the nonzero coefficients corresponding to a location in the coefficient matrix, an average and a standard deviation can be computed for the particular wavelet coefficient across the training set of N training images as indicated in step 260. Nonzero coefficients can be used to compute averages and standard deviations. Also, there should be "enough" (m of n logic) nonzero occurrences of a particular wavelet coefficient to use the coefficient as nonzero and to compute the average and standard deviation. Once values are updated in step 260, selected coefficients can be saved, for example, in memory 120 in step 270.

Figure 3:
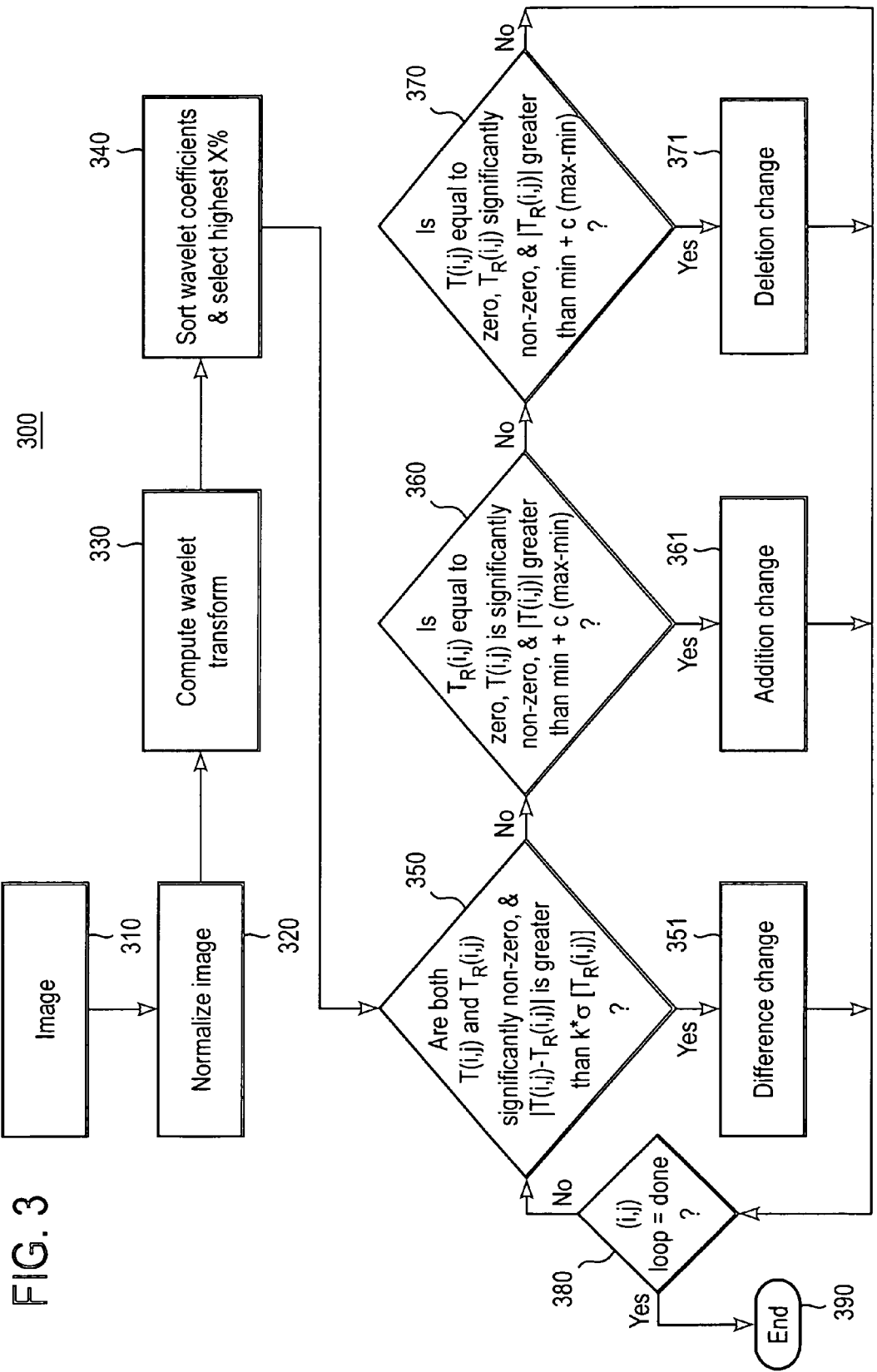
FIG. 3 is a flow chart illustrating an exemplary change detection process in accordance with the present invention.

FIG. 3 is a flow chart illustrating an exemplary change detection process in accordance with the present invention. Once a training set is developed, as described with respect to FIG. 2, the change detection of FIG. 3 can be performed.

In general, a difference change can be determined when the magnitude of the difference between a nonzero training coefficient and a nonzero value of the corresponding coefficient from, for example, a test image exceeds a specified number of standard deviations in value from the training coefficient. Other types of change can be referred to as addition change and deletion change, representing something being added to or removed from a scene, respectively.

For each wavelet coefficient level, a minimum magnitude (min value) and a maximum magnitude (max value) of the nonzero coefficients can be computed. Min values and max values can be used to define a threshold for each coefficient level used to detect a significant addition, where the training coefficient value is zero and the test coefficient magnitude exceeds the threshold. A significant deletion occurs when the training coefficient exceeds the threshold and the testing coefficient is zero. Quantities that can be stored, based on training on N images, are: average and standard deviation for each of the factor of X "selected" wavelet coefficients. Also, for each of the H levels, H maxima and H minima can also be stored, for example, in memory 120. Values can easily be updated when an additional image is added to the training set.

In accordance with the exemplary embodiment as illustrated in FIG. 3, image 310 can be normalized in step 320, and compressed by computing the wavelet transform in step 330. In step 340, wavelet coefficients can be sorted and thresholded according to a threshold value X (for example, 0.05 resulting in 5% of the coefficients being retained and 95% of coefficients being discarded without a significant diminution in information content for a reconstructed image).

Alternately, any desired threshold can be used to retain any desired percentage of coefficients. If T(i,j) represents a coefficient associated with image 310 under test and $T_R(i,j)$ represents a corresponding training coefficient, then change detection can be performed, for example, in step 350 by performing the following exemplary test:

If T(i,j), $T_R(i,j) \neq 0$;

If $|T(i,j) - T_R(i,j)| > k(\sigma(T_R(i,j)))$; \hfill (4)

indicate a difference change where k is a constant, and where sigma is the standard deviation calculated during training, i.e. standard deviation of the training coefficients, and where "$\neq$" represents a significant non-zero value (e.g., greater than 0.1, or any other desired non-zero value). If the absolute value of the difference between the test coefficient and training coefficient is greater than the product of the constant k and the standard deviation of the training coefficients, a difference change illustrated in block 351 can be inferred and indicated.

Step 360 includes detecting an addition change which can be determined by performing the following test:

If $T_R(i,j) = 0$;

$T(i,j) \neq 0$; and

If $|T(i,j)| > \min + c(\max - \min)$; \hfill (5)

indicate an addition change where c is a constant, "min" value and "max" value are calculated during training, and where "=" represents a value close enough to zero for a desired level of accuracy so as to be considered zero. Thus, if the absolute value of the test coefficient is greater than the sum of the min value and the product of the constant c and the difference between the max value and min value, an addition change as illustrated in block 361 can be inferred and indicated.

Step 370 includes detecting a deletion change which can be determined by performing the following test:

If T(i,j)=0;

$T_R(i,j) \neq 0$;

If $|T_R(i,j)|$>min+c(max−min); (6)

indicate a deletion change where c is a constant and min value and max value are calculated during training. Thus, if the absolute value of the training coefficient is greater than the sum of the min value and the product of the constant c and the difference between the max value and min value, a deletion change illustrated in bock 371 can be inferred and indicated.

Where none of the conditions of steps 350, 360 and 370 are satisfied for a given (i,j), operational flow proceeds to decision block 380. Operational flow also proceeds to decision block 380 from each of blocks 351, 361 and 371. When all (i,j) values of the process loop have been evaluated, the process ends with block 390. Otherwise, the (i,j) values are modified (e.g., incremented via any prescribed order) and operation returns to step 350.

With the training approach illustrated in FIG. 2, the calculated values associated with, for example, averaging the nonzero wavelet coefficients can, for example, cause the number of nonzero average values to either grow or shrink relative to X. Accordingly, multiple approaches can be used.

Figure 4:
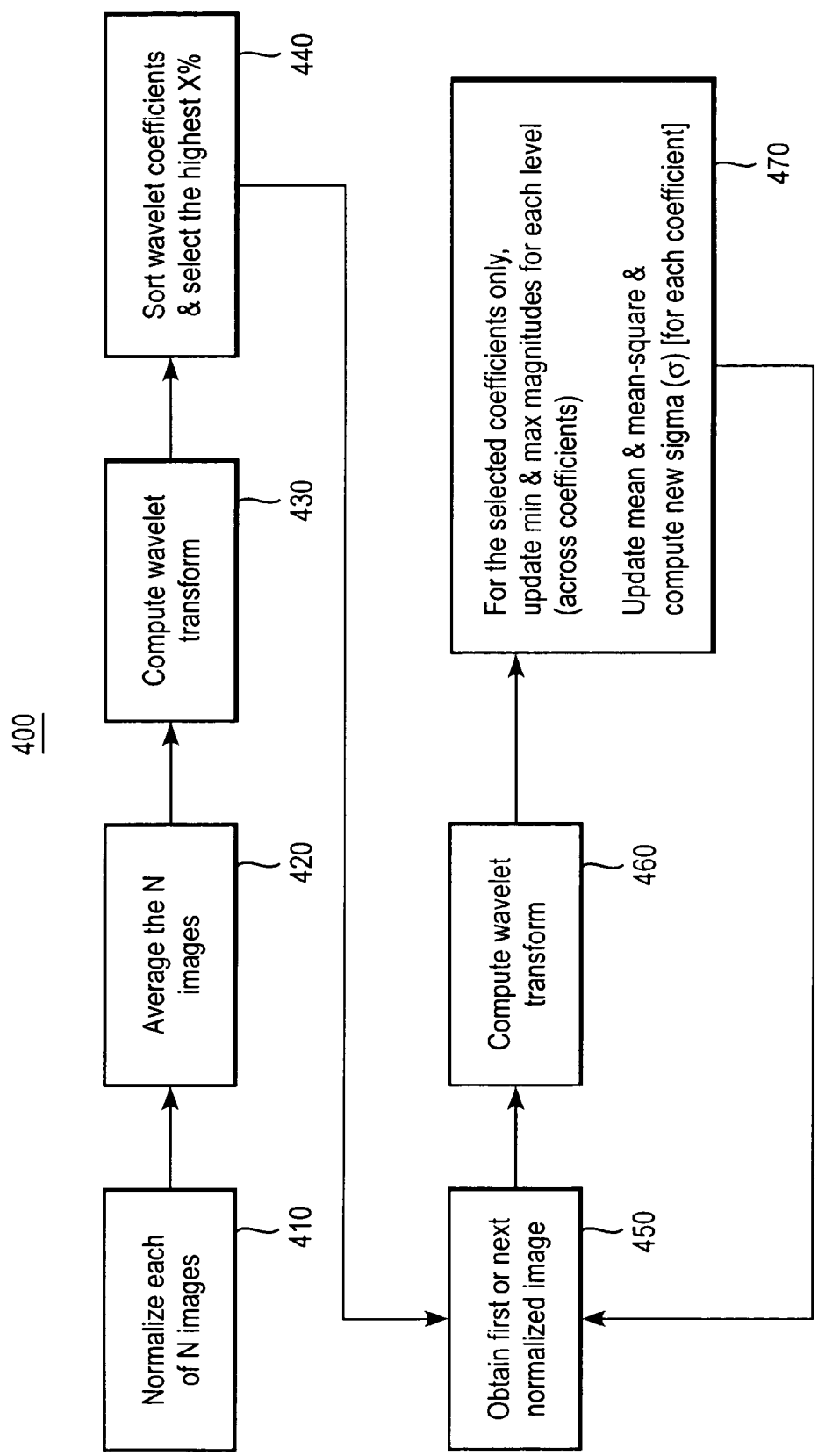
FIG. 4 is a flow chart illustrating an exemplary change detection training process in accordance with the present invention.

FIG. 4 is a flow chart illustrating an exemplary change detection training process in accordance with the present invention which can also be performed by the FIG. 1 processor 110. The change detection training process of FIG. 4 can, for example, address coefficient growth/shrinkage. Images can be normalized in step 410 and averaged in step 420, prior to wavelet compression by computation of wavelet coefficients in step 430. In step 440, a factor of X of wavelet coefficients produced in step 430 can be selected from the average of training images calculated in step 420. Selected coefficients can then be used and applied against new images until a change is detected. Averages and standard deviations of the training coefficients can be updated as new training images are processed, but particular coefficient "selections" can continue to be stored, until a change is detected.

In step 450, a new, or next image is obtained, which is followed by the computation of the wavelet transform in step 460. In step 470, for the selected coefficients (from step 440 ) the minimum and maximum values for each selected coefficient are updated. By way of example, if in a 512-×-512 pixel image array there are K wavelet coefficients, only the highest X % will be retained. The selected coefficients can be, by way of example, coefficients 1, 10, 13, 26, 89, 129 . . . and so forth. For these selected coefficients, when new correspondingly numbered coefficients are generated, the new coefficients are compared to the existing selected ones. If a new max or min is found, that becomes the new max or min. Statistical information (e.g., mean, mean-square, sigma (σ) or any other suitable statistical information) can be generated on an image-by-image basis. This process, steps 450–470, can be repeated for each new image that is obtained.

Figure 5:
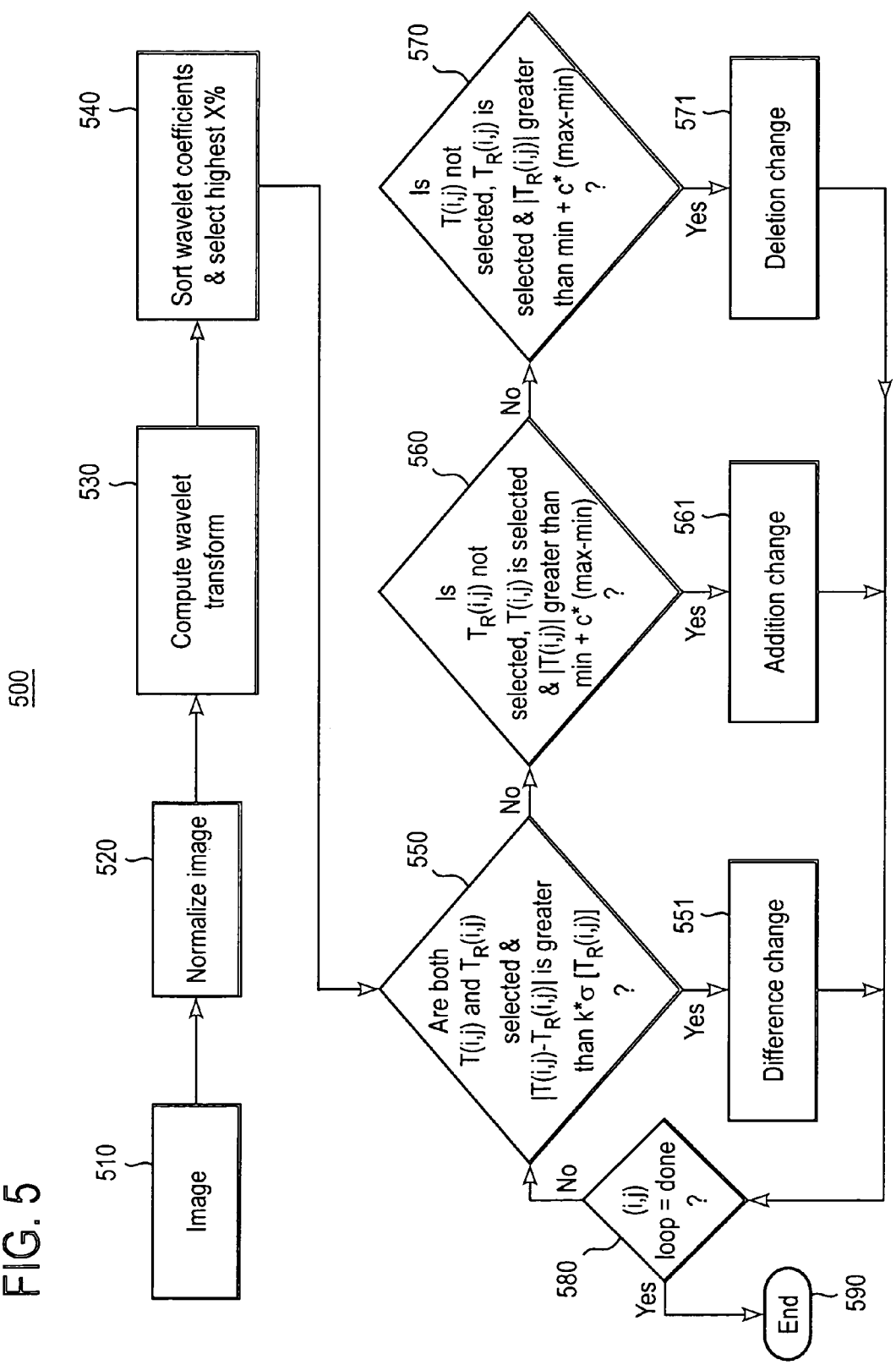
FIG. 5 is a flow chart illustrating an exemplary change detection testing process in accordance with the present invention.

FIG. 5 is a flow chart illustrating an exemplary change detection testing process in accordance with the present invention which can also be performed by the FIG. 1 processor 110. The method of FIG. 5 presupposes a training set of N images has been processed, wavelet coefficients selected, and statistical information generated. In FIG. 5 change detection testing procedure 500 first obtains a test image (e.g. image 510), which is normalized in step 520 as described above. Wavelet compression can be performed by computing the wavelet transform, as described above, in step 530, and sorting, thresholding and selecting of wavelet coefficients can be performed, as described above, in step 540. Step 550 includes detecting a difference change which can be determined by performing the following test:

If T(i,j), $T_R(i,j)$ are selected;

If $|T(i,j)-T_R(i,j)|$>k(σ(TR(i,j)); (7)

indicate a difference change where k is a constant and sigma is the standard deviation of the training coefficients. "Selected" refers to the action of step 540 in which wavelet coefficients are selected (if highest X %). Thus, if the absolute value of the difference between the training coefficient and the test coefficient is greater than the product of the constant k and standard deviation of the training coefficients, then difference change 551 ("Yes" path from step 550) can be inferred and indicated. If, however, the conditions checked for in step 550 are not true, then the method proceeds to step 560 ("No" path from step 550).

Step 560 includes detecting an addition change which can be determined by performing the following test:

If T(i,j) is selected;

If $T_R(i,j)$ is nonselected;

If $|T(i,j)|$>min+c(max−min); (8)

indicate an addition change where c is a constant and min value and max value are calculated during training. Thus, if the absolute value of the test coefficient is greater than the sum of the min value and the product of the constant c and the difference between the max value and min value, an addition change illustrated in block 561 ("Yes" path from step 560) can be inferred and indicated. If, however, the conditions checked for in step 560 are not true, then the method proceeds to step 570 ("No" path from step 560).

Step 570 includes detecting a deletion change which can be determined by performing the following test:

If T(i,j) is nonselected;

If $T_R$ (i,j) is selected;

If $|T_R(i,j)|$>min+c(max−min); (9)

indicate a deletion change where c is a constant and min value and max value are calculated during training. Thus, if the absolute value of the training coefficient is greater than the sum of the min value and the product of the constant c and the difference between the max value and min value, a deletion change illustrated as block 571 ("Yes" path from 570) can be inferred and indicated. The question of step "570 " is optional because if steps 550 and 560 are not true, then step 570 is true. Steps 550 through 571 are repeated for additional (e.g., all) wavelet coefficients generated for the latest test images. After the last wavelet coefficient is checked, a new image with a new set of wavelet coefficients can be processed by the method of FIG. 5.

Where none of the conditions of steps 550, 560 and 570 are satisfied for a given (i,j), operational flow proceeds to decision block 580. Operational flow also proceeds to decision block 580 from each of blocks 551, 561 and 571. When all (i,j) values of the process loop have been evaluated, the process ends with block 590. Otherwise, the (i,j) values are modified (e.g., incremented via any prescribed order) and operation returns to step 550.

Figure 6:
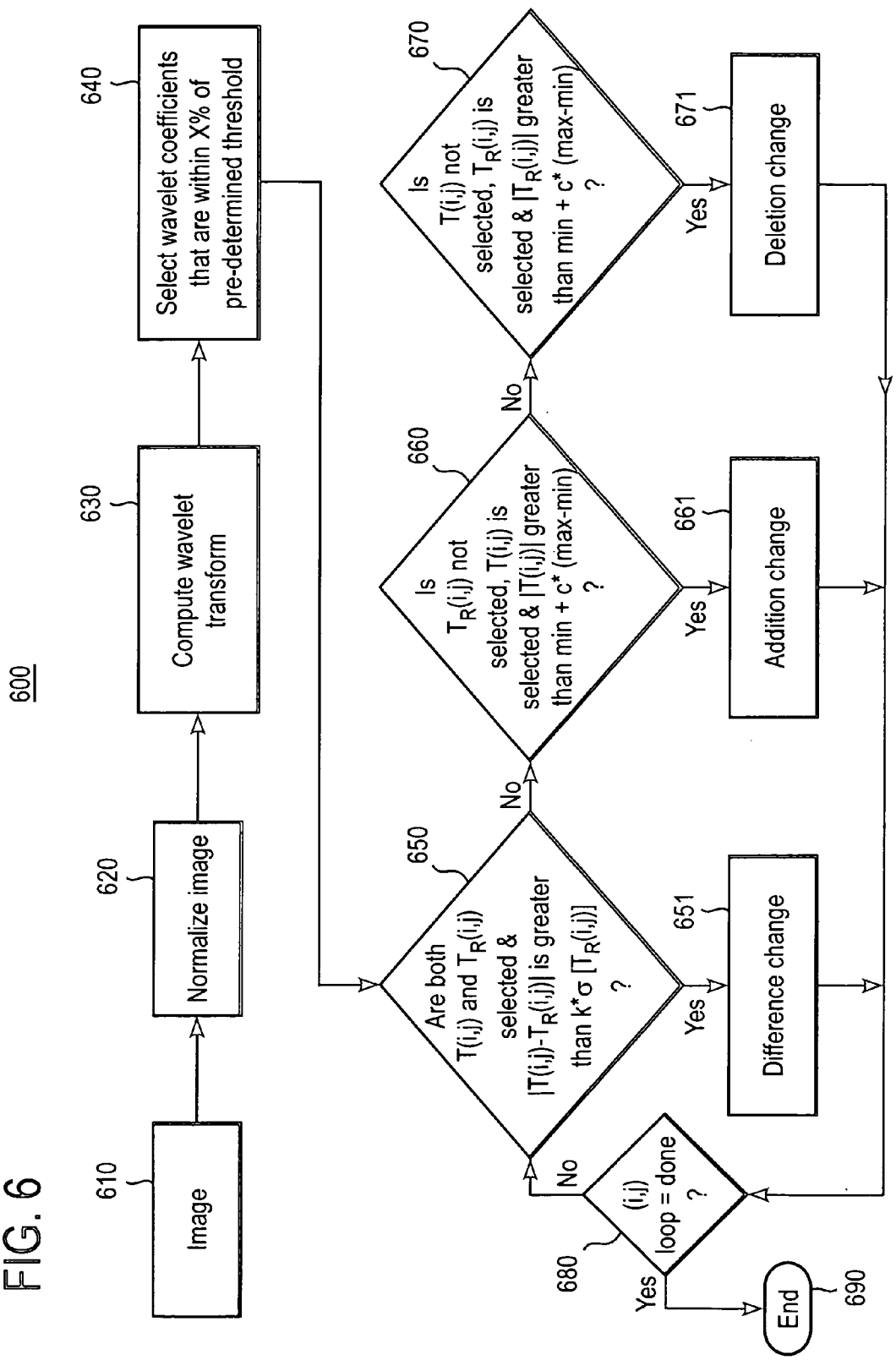
FIG. 6 is a flow chart illustrating an exemplary fast change detection testing process in accordance with the present invention.

FIG. 6 is a flow chart illustrating an exemplary fast change detection testing process in accordance with present invention. The method of FIG. 6 presupposes a training set of N images has been processed, wavelet coefficients determined and statistical information generated. As in previously described testing procedures, image 610 can be normalized in step 620, and compressed by computing wavelet transform coefficients in step 630. At step 640, however, instead of performing a processor intensive sort routine, a threshold test can be performed. From the training images, a max value is determined, and a training threshold is determined, defined as Y % of the max value. Then, each new wavelet coefficient generated in step 630 is compared to the training threshold. If the wavelet coefficient meets or exceeds the training threshold it is selected. If it is less than the training threshold it is rejected. Then, the steps of 650, 660 or 670 are performed.

Step 650, in which difference change 651 is determined, can be identical to step 550 of FIG. 5. Likewise, step 660 can be identical to step 560 of FIG. 5, and step 670 can be identical to step 570 of FIG. 5, and result in addition change 661 and deletion change 671, respectively.

Steps 650 through 671 are repeated for the wavelet coefficients generated from the latest test image. After the last wavelet coefficient is checked, then a new image, with a new set of wavelet coefficients can be processed by the method of FIG. 6.

Where none of the conditions of steps 650, 660 and 670 are satisfied for a given (i,j), operational flow proceeds to decision block 680. Operational flow also proceeds to decision block 680 from each of blocks 651, 661 and 671. When all (i,j) values of the process loop have been evaluated, the process ends with block 690. Otherwise, the (i,j) values are modified (e.g., incremented via any prescribed order) and operation returns to step 650.

In accordance with exemplary embodiments of the present invention, two dimensional wavelet transforms can be used for compression by calculating wavelet transform coefficients. Such two dimensional wavelets can yield various "levels", e.g. 0, 1, . . . H, of wavelet coefficients for an original image which is of dimension m×n where, for an exemplary case of m=n, m is $2^H$ for some positive integer H. Level 1 coefficients can contain information in the image associated with the largest wavelet surfaces, i.e. two dimensional wavelet function. As level numbers increase from one to H, corresponding wavelet surface areas can decrease until level H wavelet surfaces are the smallest possible. As an example, for a Daubechies 2 wavelet the smallest wavelet surface can be 2 pixels by 2 pixels. For a Daubechies 6 wavelet, the smallest wavelet surface can be 6 pixels by 6 pixels. Particular wavelet coefficient levels (e.g. corresponding to particular sizes of wavelet surfaces), can be filtered out or set to zero prior to performing, for example, a fast sort or threshold comparison, for coefficient retention determinations in the context of developing training values, for example, in blocks 240, 340, 440, 540 and 640 (of FIGS. 2–6, respectively).

In accordance with various exemplary embodiments of the present invention, it will be appreciated that computations can be reduced, as the wavelet transform can be faster than, for example, a fast Fourier transform. Additional computations such as, for example, simple threshold comparisons can also be computationally minimal, resulting in a robust computationally efficient method for compressing and detecting specified changes to an image representing a scene look. Computational efficiency can be affected if computationally intensive sort operations are bypassed.

The invention has been described herein with reference to particular embodiments. However, it will be readily apparent to those skilled in the art that it can be possible to embody the invention in specific forms other than those described above. This can be done without departing from the spirit of the invention. Embodiments described above are merely illustrative and should not be considered restrictive in any way. The scope of the invention is given by the appended claims, rather than the preceding description, and all variations and equivalents which fall within the range of the claims are intended to be embraced therein.

What is claimed is:

1. An apparatus for image processing to detect changes in a scene, the apparatus comprising:
   a memory; and
   a processor coupled to the memory, the processor being configured to:
      compute a wavelet transform of an image corresponding to a scene to compress the image;
      threshold coefficients associated with the computed wavelet transform to select a subset of coefficients;
      generate at least one average value by processing N training images corresponding to the scene, wherein the at least one average value includes a training set of average coefficients corresponding to the N training images, and a standard deviation therefrom;
      determine that the selected subset of coefficients and the training set of average coefficients are non-zero; and
      determine whether a difference change has occurred by comparing a magnitude of a difference between the selected subset of coefficients and the training set of average coefficients to a predetermined number of the standard deviation.

2. The apparatus of claim 1, wherein the processor, in training, is configured to:
   (a) normalize a first one of the N training images;
   (b) compute a wavelet transform to produce wavelet coefficients associated with the first one;
   (c) sort the computed wavelet coefficients and select at least one wavelet coefficient above a threshold;
   (d) update the at least one average value to reflect the selected coefficients; and
   (e) repeat steps (a) through (d) for each of the N training images.

3. The apparatus of claim 1, wherein the processor, in training, is configured to:
   (a) normalize each of the N training images;
   (b) compute the at least one average value associated with the N training images;
   (c) compute a wavelet transform to produce a set of wavelet coefficients associated with the N training images;
   (d) sort the computed set of wavelet coefficients according to a largest magnitude and select at least one wavelet coefficient above a threshold; and (e) for each of the N training images corresponding to the selected coefficient:
  (i) compute a wavelet transform; and
  (ii) update the at least one average value based on the selected coefficient.

4. The apparatus of claim 1, wherein the processor is configured to indicate that a difference change has occurred when the magnitude is greater than the predetermined number of the standard deviation.

5. An apparatus for image processing to detect changes in a scene, the apparatus comprising:
a memory; and
a processor coupled to the memory, the processor being configured to:
  compute a wavelet transform of an image corresponding to a scene to compress the image;
  threshold coefficients associated with the computed wavelet transform to select a subset of coefficients;
  generate at least one average value by processing N training images corresponding to the scene, wherein the at least one average value includes a training set of average coefficients corresponding to the N training images;
  determine that the selected subset of coefficients is non-zero and the training set of average coefficients is zero; and
  determine whether an addition change has occurred by comparing a magnitude of the selected subset of coefficients to a minimum value plus a difference between a maximum value and the minimum value times a predetermined multiple.

6. The apparatus of claim 5, wherein the processor is configured to indicate that an addition change has occurred when the magnitude is greater than the minimum value plus the difference between the maximum value and the minimum value times the predetermined multiple.

7. The apparatus of claim 5, wherein the processor, in training, is configured to:
  (a) normalize a first one of the N training images;
  (b) compute a wavelet transform to produce wavelet coefficients associated with the first one;
  (c) sort the computed wavelet coefficients and select at least one wavelet coefficient above a threshold;
  (d) update the least one average value to reflect the selected coefficients; and
  (e) repeat steps (a) through (d) for each of the N training images.

8. The apparatus of claim 5, wherein the processor, in training, is configured to:
  (a) normalize each of the N training images;
  (b) compute the at least one average value associated with the N training images;
  (c) compute a wavelet transform to produce a set of wavelet coefficients associated with the N training images;
  (d) sort the computed set of wavelet coefficients according to a largest magnitude and select at least one wavelet coefficient above a threshold; and
  (e) for each of the N training images corresponding to the selected coefficient:
    (i) compute a wavelet transform; and
    (ii) update the at least one average value based on the selected coefficient.

9. An apparatus for image processing to detect changes in a scene, the apparatus comprising:
a memory; and
a processor coupled to the memory, the processor being configured to:
  compute a wavelet transform of an image corresponding to a scene to compress the image;
  threshold coefficients associated with the computed wavelet transform to select a subset of coefficients;
  generate at least one average value by processing N training images corresponding to the scene, wherein the at least one average value includes a training set of average coefficients corresponding to the N training images;
  determine that the selected subset of coefficients is zero and the training set of average coefficients is non-zero; and
  determine whether a deletion change has occurred by comparing a magnitude of the training set of average coefficients to a minimum value plus a difference between a maximum value and the minimum value times a predetermined multiple.

10. The apparatus of claim 9, wherein the processor is configured to indicate that a deletion change has occurred when the magnitude is greater than the minimum value plus the difference between the maximum value and the minimum value times the predetermined multiple.

11. The apparatus of claim 9, wherein the processor, in training, is configured to:
  (a) normalize a first one of the N training images;
  (b) compute a wavelet transform to produce wavelet coefficients associated with the first one;
  (c) sort the computed wavelet coefficients and select at least one wavelet coefficient above a threshold;
  (d) update the at least one average value to reflect the selected coefficients; and
  (e) repeat steps (a) through (d) for each of the N training images.

12. The apparatus of claim 9, wherein the processor, in training, is configured to:
  (a) normalize each of the N training images;
  (b) compute the at least one average value associated with the N training images;
  (c) compute a wavelet transform to produce a set of wavelet coefficients associated with the N training images;
  (d) sort the computed set of wavelet coefficients according to a largest magnitude and select at least one wavelet coefficient above a threshold; and
  (e) for each of the N training images corresponding to the selected coefficient:
    (i) compute a wavelet transform; and
    (ii) update the at least one average value based on the selected coefficient.

13. A method of image processing to detect changes in a scene, the method comprising:
computing a wavelet transform of an image corresponding to the scene to compress the image;
thresholding coefficients associated with the computed wavelet transform to select a subset of coefficients;
generating at least one average value by processing N training images corresponding to the scene, wherein the at least one average value includes a training set of average coefficients corresponding to the N training images, and a standard deviation therefrom;
determining that the selected subset of coefficients and the training set of average coefficients are non-zero; and
determining whether a difference change has occurred by comparing a magnitude of a difference between the selected subset of coefficients and the training set of average coefficients to a predetermined number of the standard deviation.

14. The method of claim 13, wherein training includes:
(a) normalizing a first one of the N training images;
(b) computing a wavelet transform to produce wavelet coefficients associated with the first one;
(c) sorting the computed wavelet coefficients and selecting at least one wavelet coefficient above a threshold;
(d) updating the at least one average value to reflect the selected coefficients; and
(e) repeating steps (a) through (d) for each of the N training images.

15. The method of claim 13, wherein training includes:
(a) normalizing each of the N training images;
(b) computing the at least one average value associated with the N training images;
(c) computing a wavelet transform to produce a set of wavelet coefficients associated with the N training images;
(d) sorting the computed set of wavelet coefficients according to a largest magnitude and select at least one wavelet coefficient above a threshold; and
(e) for each of the N training images corresponding to the selected coefficient:
(i) computing a wavelet transform; and
(ii) updating the at least one average value based on the selected coefficient.

16. The method of claim 13, comprising:
indicating that a difference change has occurred when the magnitude is greater than the predetermined number of the standard deviation.

17. A method of image processing to detect changes in a scene, the method comprising:
computing a wavelet transform of an image corresponding to the scene to compress the image;
thresholding coefficients associated with the computed wavelet transform to select a subset of coefficients;
generating at least one average value by processing N training images corresponding to the scene, wherein the at least one average value includes a training set of average coefficients corresponding to the N training images;
determining that the selected subset of coefficients is non-zero and the training set of average coefficients is zero; and
determining whether an addition chance has occurred by comparing a magnitude of the selected subset of coefficients to a minimum value plus a difference between a maximum value and the minimum value times a predetermined multiple.

18. The method of claim 13, comprising:
indicating that an addition change has occurred when the magnitude is greater than the difference between the maximum value and the minimum value times the predetermined multiple.

19. The method of claim 17, wherein training includes:
(a) normalizing a first one of the N training images;
(b) computing a wavelet transform to produce wavelet coefficients associated with the first one;
(c) sorting the computed wavelet coefficients and selecting at least one wavelet coefficient above a threshold;
(d) updating the at least one average value to reflect the selected coefficients; and
(e) repeating steps (a) through (d) for each of the N training images.

20. The method of claim 17, wherein training includes:
(a) normalizing each of the N training images;
(b) computing the at least one average value associated with the N training images;
(c) computing a wavelet transform to produce a set of wavelet coefficients associated with the N training images;
(d) sorting the computed set of wavelet coefficients according to a largest magnitude and select at least one wavelet coefficient above a threshold; and
(e) for each of the N training images corresponding to the selected coefficient:
(i) computing a wavelet transform; and
(ii) updating the at least one average value based on the selected coefficient.

21. A method of image processing to detect changes in a scene, the method comprising:
computing a wavelet transform of an image corresponding to the scene to compress the image;
thresholding coefficients associated with the computed wavelet transform to select a subset of coefficients;
generating at least one average value by processing N training images corresponding to the scene, wherein the at least one average value includes a training set of average coefficients corresponding to the N training images;
determining that the selected subset of coefficients is zero and the training set of average coefficients is non-zero; and
determining whether a deletion change has occurred by comparing a magnitude of the training set of average coefficients to a minimum value plus a difference between a maximum value and the minimum value times a predetermined multiple.

22. The method of claim 21, comprising:
indicating that a deletion change has occurred when the magnitude is greater than the minimum value plus the difference between the maximum value and the minimum value times the predetermined multiple.

23. The method of claim 21, wherein training includes:
(a) normalizing a first one of the N training images;
(b) computing a wavelet transform to produce wavelet coefficients associated with the first one;
(c) sorting the computed wavelet coefficients and selecting at least one wavelet coefficient above a threshold;
(d) updating the at least one average value to reflect the selected coefficients; and
(e) repeating steps (a) through (d) for each of the N training images.

24. The method of claim 21, wherein training includes:
(a) normalizing each of the N training images;
(b) computing the at least one average value associated with the N training images;
(c) computing a wavelet transform to produce a set of wavelet coefficients associated with the N training images;
(d) sorting the computed set of wavelet coefficients according to a largest magnitude and select at least one wavelet coefficient above a threshold; and
(e) for each of the N training images corresponding to the selected coefficient:
(i) computing a wavelet transform; and
(ii) updating the at least one average value based on the selected coefficient.

* * * * *

UNITED STATES PATENT AND TRADEMARK OFFICE
CERTIFICATE OF CORRECTION

| | | |
|---|---|---|
| PATENT NO. | : 7,149,361 B2 | Page 1 of 1 |
| APPLICATION NO. | : 10/303759 | |
| DATED | : December 12, 2006 | |
| INVENTOR(S) | : Larry Peele et al. | |

It is certified that error appears in the above-identified patent and that said Letters Patent is hereby corrected as shown below:

Column 13, Claim 17, line 47, change "chance" to --change--; and

Column 13, Claim 18, line 52, change "13" to --17--.

Signed and Sealed this

Third Day of July, 2007

JON W. DUDAS
*Director of the United States Patent and Trademark Office*